(12) United States Patent
Brech et al.

(10) Patent No.: US 9,652,612 B2
(45) Date of Patent: May 16, 2017

(54) SECURITY WITHIN A SOFTWARE-DEFINED INFRASTRUCTURE

(71) Applicant: International Business Machines Corporation, Armonk, NY (US)

(72) Inventors: Brad L. Brech, Rochester, MN (US); Scott W. Crowder, Pleasantville, NY (US); Hubertus Franke, Cortlandt Manor, NY (US); Nagui Halim, Yorktown Heights, NY (US); Matt R. Hogstrom, Raleigh, NC (US); Chung-Sheng Li, Scarsdale, NY (US); Pratap C. Pattnaik, Ossining, NY (US); Dimitrios Pendarakis, Westport, CT (US); Josyula R. Rao, Briarcliff Manor, NY (US); Radha P. Ratnaparkhi, Ridgefield, CT (US); Michael D. Williams, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/667,877

(22) Filed: Mar. 25, 2015

(65) Prior Publication Data

US 2016/0283713 A1 Sep. 29, 2016

(51) Int. Cl.
*G06F 21/55* (2013.01)
*G06F 9/50* (2006.01)

(52) U.S. Cl.
CPC .......... *G06F 21/554* (2013.01); *G06F 9/5083* (2013.01); *G06F 21/55* (2013.01)

(58) Field of Classification Search
CPC ............................ G06F 21/554; G06F 9/5083
See application file for complete search history.

(56) References Cited

U.S. PATENT DOCUMENTS

| 6,851,113 B2 | 2/2005 | Hemsath |
| 6,986,061 B1 | 1/2006 | Kunzinger |
| 2012/0324530 A1 | 12/2012 | Hitomi et al. |
| 2013/0031364 A1 | 1/2013 | Glew et al. |
| 2014/0007048 A1 | 1/2014 | Qureshi et al. |
| 2014/0165213 A1 | 6/2014 | Stuntebeck |

(Continued)

OTHER PUBLICATIONS

Ringwald et al.; "Architecture hybride : optimiser la localisation de vos applications ( Fit for Purpose )" UDM 2012 L'Universite du Mainframe et des Systemes Hybrides; 15 et 16 mars—IBM Forum Paris.

(Continued)

*Primary Examiner* — Oleg Korsak
(74) *Attorney, Agent, or Firm* — Stephen R. Yoder

(57) ABSTRACT

There is a method and system that includes establishing a security container that describes a workload and a set of resources that corresponds to the workload in a software-defined environment, determining a set of security criteria for the security container, monitoring the workload and the set of resources for security events based, at least in part, upon the set of security criteria, and responsive to identifying a security event, adjusting one or more security mechanisms. The steps of monitoring and adjusting are operated within the software-defined environment.

16 Claims, 6 Drawing Sheets

(56) References Cited

U.S. PATENT DOCUMENTS

2014/0317677 A1* 10/2014 Vaidya .................... H04L 63/20
726/1
2016/0065618 A1* 3/2016 Banerjee ................. H04L 63/20
726/1

OTHER PUBLICATIONS

PCT Application No. PCT/IB2016/051638 filed, Mar. 23, 2016, Entitled "Security Within a Software-Defines Infrastructure".
International Search Report & Written opinion, International Application No. PCT/IB2016/051638, International Filing Date Mar. 23, 2016, 13 pages.

\* cited by examiner

SECURITY WITHIN A SOFTWARE-DEFINED INFRASTRUCTURE

BACKGROUND OF THE INVENTION

The present invention relates generally to the field of software-defined environments (SDE), and more particularly to security in an SDE.

Enterprises are increasingly aggressive in moving mission-critical and performance-sensitive applications to heavily virtualized environment on shared infrastructure and cloud. Mobile, social, and analytics applications are oftentimes directly developed and operated on shared infrastructure and cloud. Current virtualization and cloud solution only allow basic abstraction of the computing, storage, and network resources in terms of their capacity. This approach often calls for standardization of the underlying system architecture to simplify the abstraction of these resources. Further, the workload-optimized system approach relies on tight integration of the workload (including compiler) to the underlying system architecture. This approach allows direct leverage of the special capabilities offered by each micro-architecture and by the system level capabilities at the expense of required labor-intensive optimization.

In a software defined environment (SDE), many virtual "systems" may be created within the same physical system and/or multiple physical systems may be virtualized into a single virtual system. There are no permanent associations (or bindings) between the logical resources and physical resources as software defined "systems" can be continuously created from scratch, continuously evolved, and destroyed at the end.

A framework, referred to herein as the "Pfister framework," has been used to describe workload characteristics of a given application. The Pfister framework considers "thread contention" versus "data contention." With that in mind, four workload categories are defined: (i) mixed workload updating shared data or queues (such as enterprise software, also known as application and integration middleware); (ii) highly threaded applications; (iii) parallel data structures with analytics (such as frameworks for storage and large-scale processing of data sets on cluster computing environments); and (iv) small discrete applications.

SUMMARY

According to a first aspect of the present invention, there is a method that includes establishing a security container that describes a workload and a set of resources that corresponds to the workload in a software-defined environment, determining a set of security criteria for the security container, monitoring the workload and the set of resources for security events based, at least in part, upon the set of security criteria, and responsive to identifying a security event, adjusting one or more security mechanisms. The steps of monitoring and adjusting are operated within the software-defined environment.

According to a second aspect of the present invention, there is a computer program product that includes a computer readable storage medium having stored thereon program instructions programmed to establish a security container that describes a workload and a set of resources that corresponds to the workload in a software-defined environment, determine a set of security criteria for the security container, monitor the workload and the set of resources for security events based, at least in part, upon the set of security criteria, and responsive to identifying a security event, adjust one or more security mechanisms.

According to a third aspect of the present invention, there is a computer system that includes a processor(s) set, and a computer readable storage medium. The processor set is structured, located, connected, and/or programmed to run program instructions stored on the computer readable storage medium and the program instructions include program instructions programmed to establish a security container that describes a workload and a set of resources that corresponds to the workload in a software-defined environment, determine a set of security criteria for the security container, monitor the workload and the set of resources for security events based, at least in part, upon the set of security criteria, and responsive to identifying a security event, adjust one or more security mechanisms.

DETAILED DESCRIPTION

Figure 1:
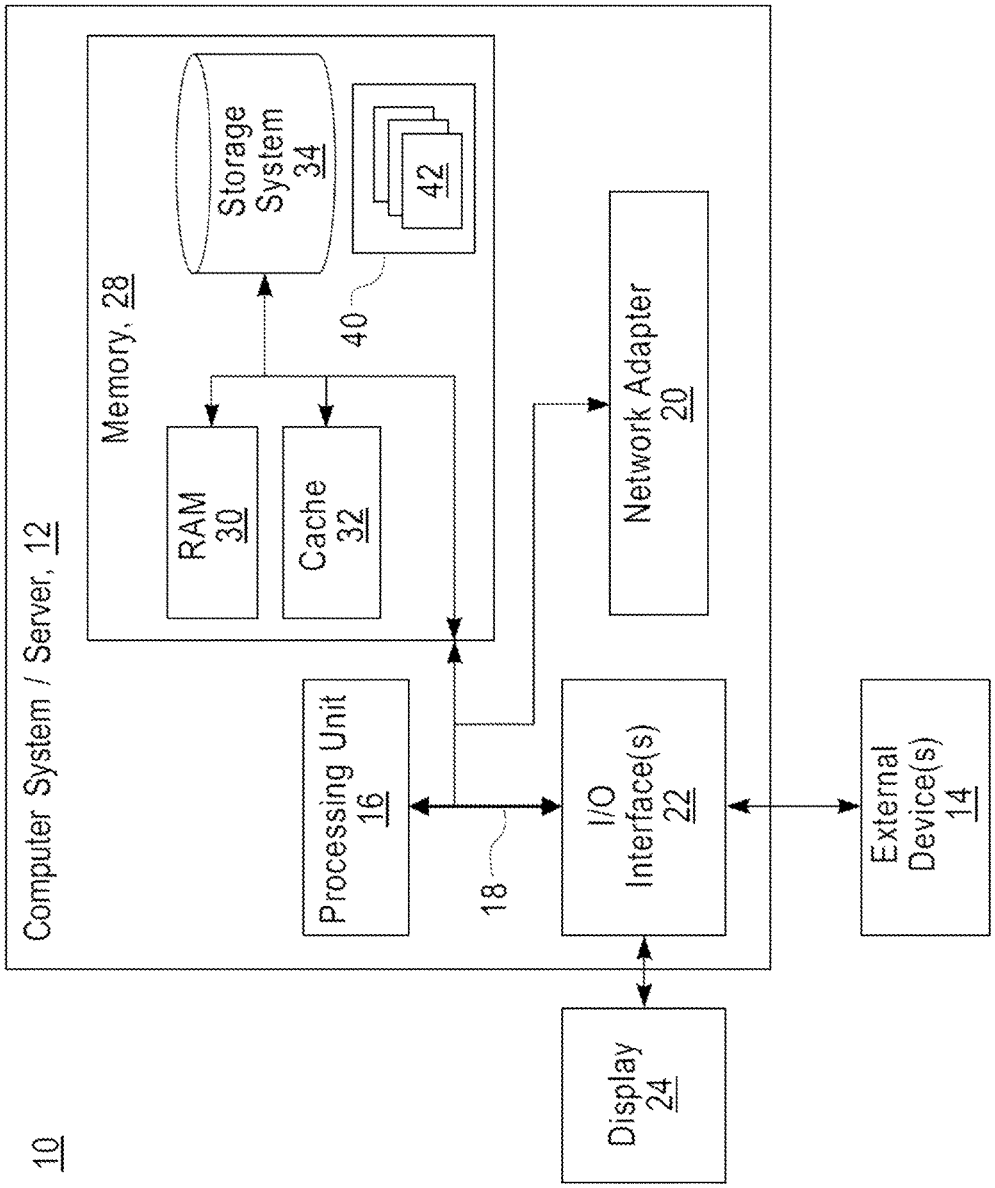
FIG. 1 depicts a cloud computing node used in a first embodiment of a system according to the present invention.

End-to-end security for a software defined environment is provided by establishing self-describing containers for workload resources. Enforcement mechanisms for security policies are developed, deployed, and operated within the software defined environment. The present invention is a system, a method, and/or a computer program product. The computer program product includes a computer readable storage medium (or media) having computer readable program instructions thereon for causing a processor to carry out aspects of the present invention.

The computer readable storage medium is a tangible device that retain and/or stores instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are, according to some embodiments, downloaded to respective computing/processing devices from a computer readable storage medium or to an external computer or external storage device via a network, for example, the Internet, a local area network, a wide area network and/or a wireless network. The network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions.

The computer readable program instructions are, according to some embodiments of the present invention, provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that directs a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions are, according to some embodiments of the present invention, loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, are, in some embodiments, implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that are rapidly provisioned and released with minimal management effort or interaction with a provider of the service. For some embodiments of the present invention, this cloud model includes at least five characteristics, at least three service models, and at least four deployment models.

Characteristics are as follows:

On-demand self-service: a cloud consumer unilaterally provisions computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities are rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage is monitored, controlled, and/or reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which includes, in some embodiments, operating systems and/or applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It is managed by the organization or a third party and exists either on-premises or off-premises.

Community cloud: the cloud infrastructure is shared by several organizations and supports a specific community that has shared concerns (e.g., mission, security requirements, policy, and compliance considerations). It is managed by the organizations or a third party and exists either on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that are suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules include routines, programs, objects, components, logic, data structures, and so on that perform particular tasks or implement particular abstract data types. Computer system/server 12, according to some embodiments of the present invention, are practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 includes computer system readable media in the form of volatile memory, such as random access memory (RAM) 30 and/or cache memory 32. Computer system/server 12 further includes, in some embodiments, other removable/non-removable, volatile/non-volatile computer system storage media. By way of example only, storage system 34 is provided for reading from and writing to a non-removable, non-volatile magnetic media (not shown and typically called a "hard drive"). By further example, and although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media are provided. In such instances, each can be connected to bus 18 by one or more data media interfaces. As will be further depicted and described below, memory 28 includes, in some embodiments, at least one program product having a set (e.g., at least one) of program modules that are configured to carry out the functions of embodiments of the invention.

Program/utility 40, having a set (at least one) of program modules 42, is stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 also, according to some embodiments of the present invention, communicates with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication occurs, in some embodiments, via Input/Output (I/O) interfaces 22. Still yet, computer system/server 12 communicates, in some embodiments, with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
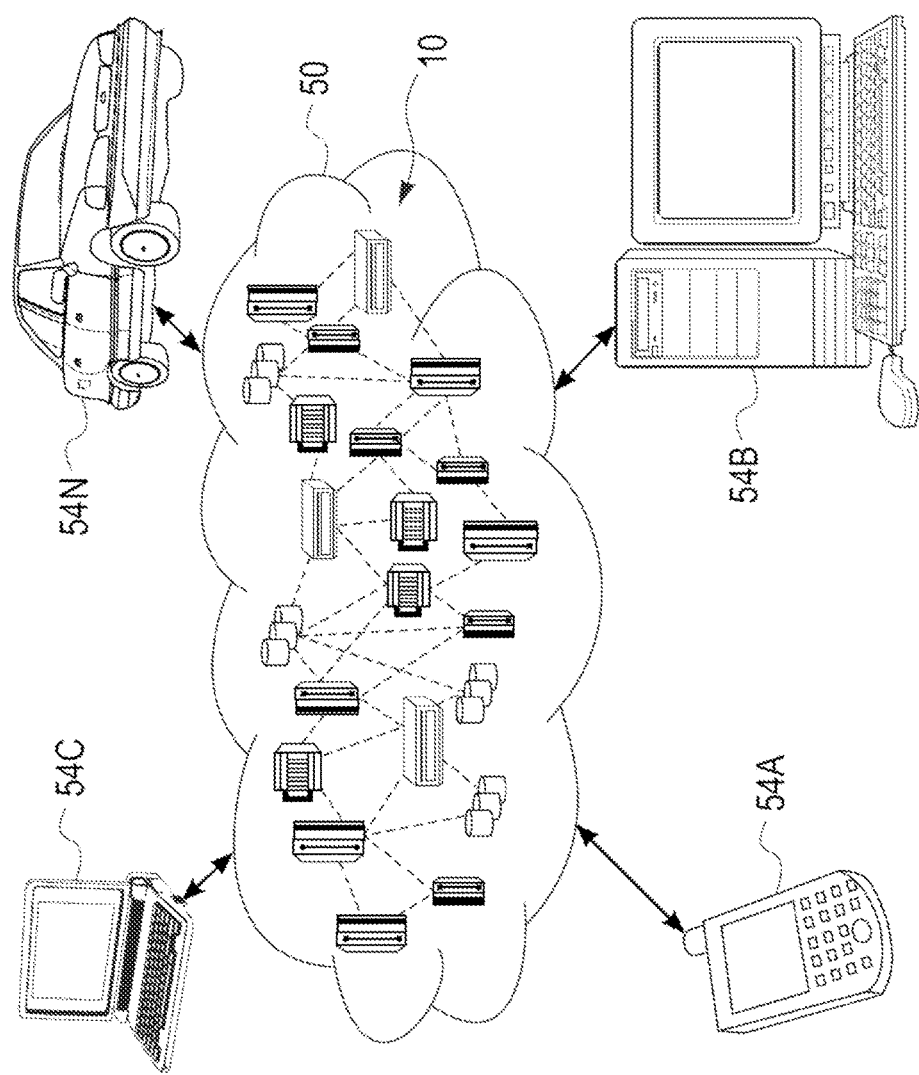
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another. They are grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 communicate with any type of computerized device over any type of network and/or network addressable connection (e.g., using a web browser).

Figure 3:
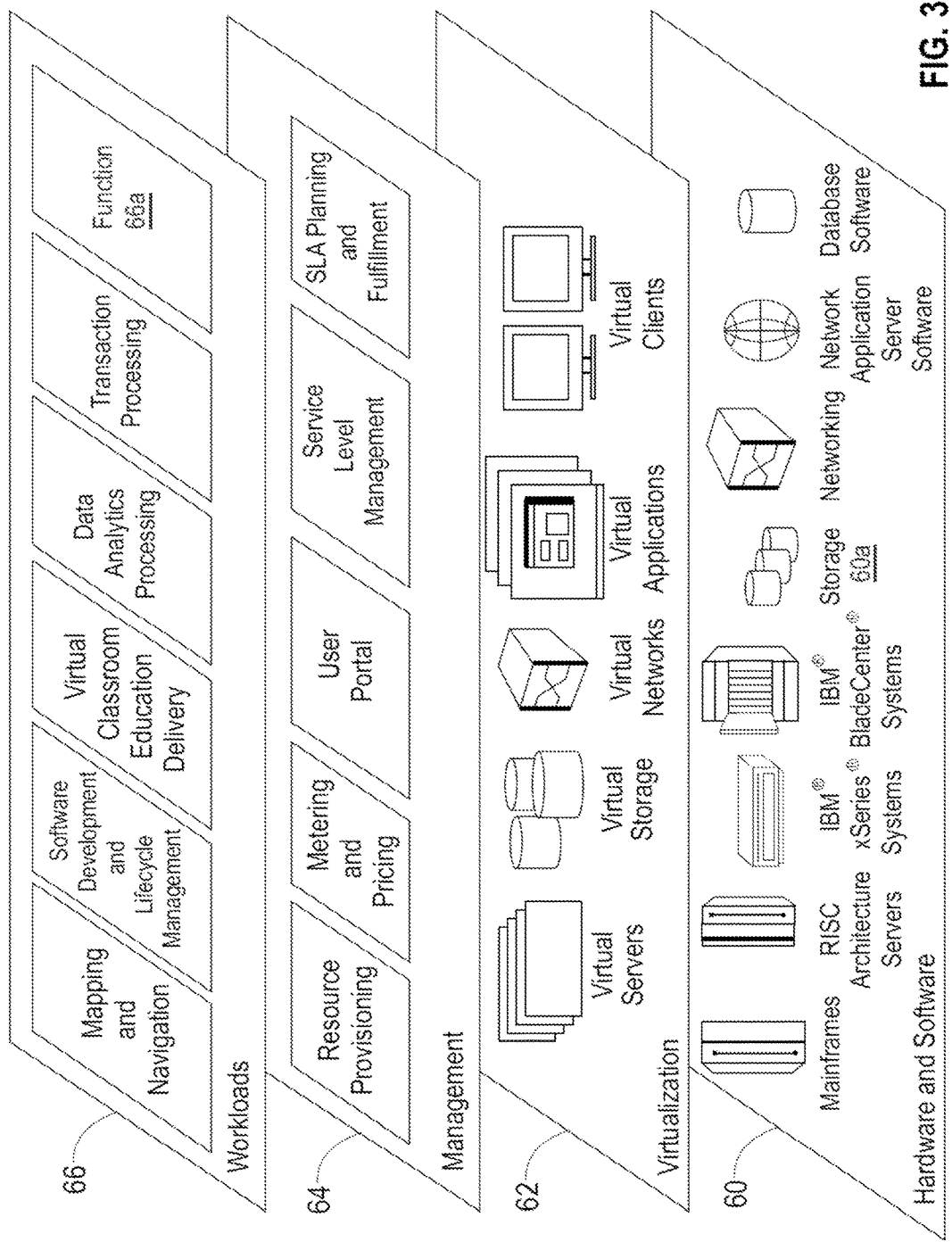
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices 60a; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities are provided: virtual servers; virtual storage; virtual networks, including virtual private networks; virtual applications and operating systems; and virtual clients.

In one example, management layer 64 provides the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment is utilized. Examples of workloads and functions which are provided from this layer include: mapping and navigation; software development and lifecycle management; virtual classroom education delivery; data analytics processing; transaction processing; and functionality, according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Figure 4:
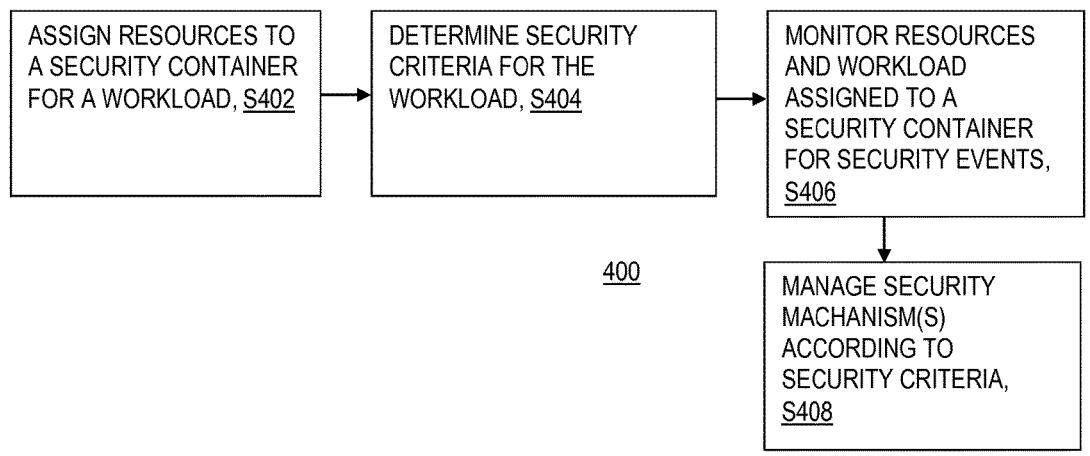
FIG. 4 is a flowchart showing a first embodiment method performed, at least in part, by the first embodiment system.
Figure 5:
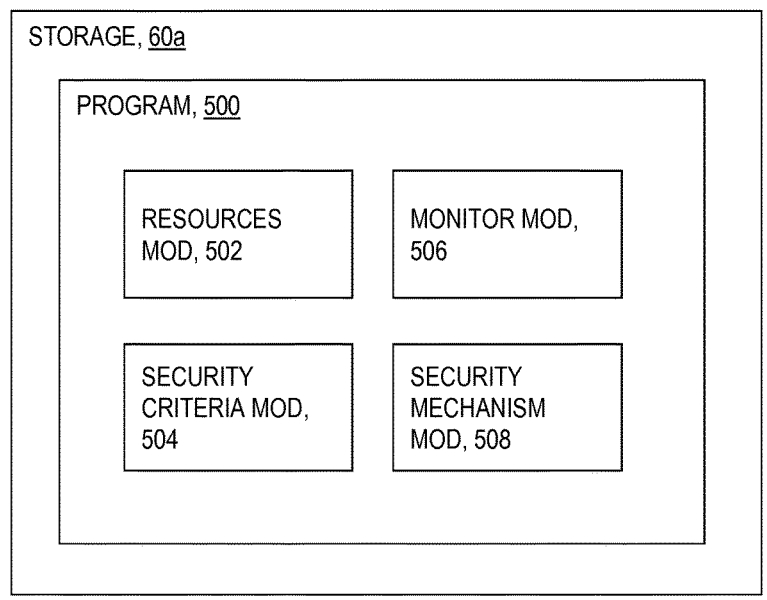
FIG. 5 is a block diagram view of a machine logic (for example, software) portion of the first embodiment system.

FIG. 4 shows flowchart 400 depicting a method according to the present invention. FIG. 5 shows program 500 for performing at least some of the method steps of flowchart 400. This method and associated software will now be discussed, over the course of the following paragraphs, with extensive reference to FIG. 4 (for the method step blocks) and FIG. 5 (for the software blocks). As shown in FIG. 5, one exemplary physical location where program 500 is stored is in storage block 60a (see FIG. 3).

Processing begins at step S402, where resources module ("mod") 502 assigns resources to a security container for a workload(s) to be processed within a software-defined environment. The security container is a self-describing container. The characteristics of a self-describing container are described in detail below in the Further Comments and/or Embodiments sub-section of this Detailed Description. A security container is made up of several sub-containers, where the sub-containers represent divisible portions of a workload, environment, and/or infrastructure. To summarize for this discussion, an exemplary security container provides for fine-grained end-to-end security by identifying various resources selected for completing a specified workload(s). These resources are referred to herein as "content" that resides "inside" the security container. Resources include: (i) compute abstractions; (ii) storage abstractions; (iii) network abstractions; and/or (iv) users. In that way, the totality of the end-to-end run time environment is captured by the software-defined security container. In this example, the security container is established for each runtime environment, where the runtime environment includes the abstracted infrastructure and user(s) corresponding to a given workload.

Processing proceeds to step S404, where security criteria mod 504 determines the security criteria for the specified workload. Each security container is associated with a set of security criteria. For example, policy specification, monitoring, and enforcement is determined according to the specified workload and corresponding security container. In some embodiments of the present invention, service level agreements are accounted for in the security criteria. A detailed discussion of the security criteria is discussed below with respect to: (i) container-specific policy specification; (ii) multi-faceted integrity monitoring; and (iii) fine-grained isolation management.

Processing proceeds to step S406, where monitor mod 506 monitors the resources and workload assigned to a security container for security events. Security events are pre-determined and/or recognized as a deviation from observed behavior. Security intelligence is based on various techniques including, but not limited to: (i) deep introspection; (ii) condition-based monitoring; (iii) behavior models for specified users; (iv) behavior models for specified processes; (v) behavior models for specified workloads; and/or (vi) behavior models for specified infrastructure. In this step, monitoring for security events includes tracking and/or reporting identified security events. Each security event, as discussed in the next step, may prompt a unique responsive action. Security events are, in this example, associated with: (i) reliability; (ii) availability; (iii) serviceability; (iv) resiliency; and/or (v) vulnerability.

Processing ends at step S408, where security mechanisms mod 508 manages security mechanisms according to the identified security events. Security mechanisms include, but are not limited to: (i) quarantine actions (e.g. isolation); (ii) migration actions (e.g. workload rejuvenation); and/or (iii) active monitoring actions. A detailed discussion of security mechanisms follows below.

Some embodiments of the present invention recognize the following facts, potential problems, and/or potential areas for improvement with respect to the current state of the art: (i) due to the substantial virtualization in a software defined environment (SDE), the identities of the machine and/or network cannot be relied upon; (ii) the use of dedicated and/or virtual appliances (e.g. firewalls, accelerators, DPI, IDS/IPS, DLP, load balancing, and gateways) reduce the significance of the machine and/or network identities in information technology (IT) security; (iii) due to the agility of an SDE, standing up computing resources, storage resources, and/or networking storage, which are programmable, are accomplished quickly; (iv) due to the agility of an SDE, tearing down computing resources, storage resources, and/or networking storage, which are programmable, are accomplished quickly; (v) the rapid standing up and tearing down of an SDE breaks from the long-term association between security policies and the underlying hardware and software environments(s); (vi) an SDE environment is better implemented where security policies directed to users, workloads, and/or software defined infrastructure (SDI) are quickly established and continuously evolved; (vii) the increased resource heterogeneity of an SDE, resources are abstracted in terms of capability; (viii) the increased resource heterogeneity of an SDE, resources are abstracted in terms of capacity; and/or (ix) the normalization of resource capability across multiple types of resources may mask differences in various non-functional aspects of the resource, such as the vulnerability to outages, and the security risk.

Some embodiments of an SDE security framework include: (i) security models based on self-describing, fine-grained containers that augment notions of context-aware, policy-based isolation and integrity for people, processes, and/or data; (ii) container-specific policy specification, monitoring, enforcement against a common workload, and resource abstractions; (iii) security monitoring intelligence, based on techniques such as deep introspection, condition based monitoring, behavior models for people, process, workloads and infrastructure; (iv) context and risk-aware proactive orchestration mechanisms to optimize security dynamically insert and remove security mechanisms, e.g., virtual patch, network security reconfiguration in response to publication of new vulnerability; and/or (v) execution of the security monitoring, analytics, and orchestration are developed, deployed, and operated within the same software defined environment and hence leverage the same common workload and resource abstraction.

Some embodiments of the present invention maintain the integrity and/or the confidentiality of elements within an SDE. There are various types of integrity that are maintained by various embodiments of the present invention, including: (i) infrastructure integrity from the bottom and up; (ii) infrastructure access integrity (such as data in transit); (iii) data access integrity (such as data at rest); (iv) people integrity (for example, federated identity management); and/or (v) workload integrity (both static and dynamic).

Infrastructure integrity looks to ensure that the infrastructure stack has not been tampered with, including the hardware, hypervisor, operating system, and/or cloud management. Access integrity refers to access control provided by, for example, mandatory access control (MAC) and role-based access control (RBAC). Also, regulatory compliance and data encryption are part of access control. Static workload integrity is associated with security groups and/or security zones established through physical, virtual, firewall, and crypto isolation. Dynamic workload integrity is associated with, for example, middlebox insertion.

There are also various types of confidentiality available in an SDE, including: (i) VM isolation (for example, isolation created through different address space, oftentimes sharing the same hypervisor); (ii) network isolation (for example, isolation created through different VLANs); (iii) physical isolation (for example, isolation created through air gap (e.g. region and availability zone)); and/or (iv) crypto isolation (as deployed in an integrated trusted virtual data center (iTVDc)), (for example, isolation created through different encryption keys).

Maintenance of an SDE also includes providing for periodic workload rejuvenation. Workload rejuvenation arises when the likelihood of an attack increases to a certain level, often a pre-determined, periodic cycle. In response to a certain level of risk, the image is rebuilt from known clean sources.

Figure 6:
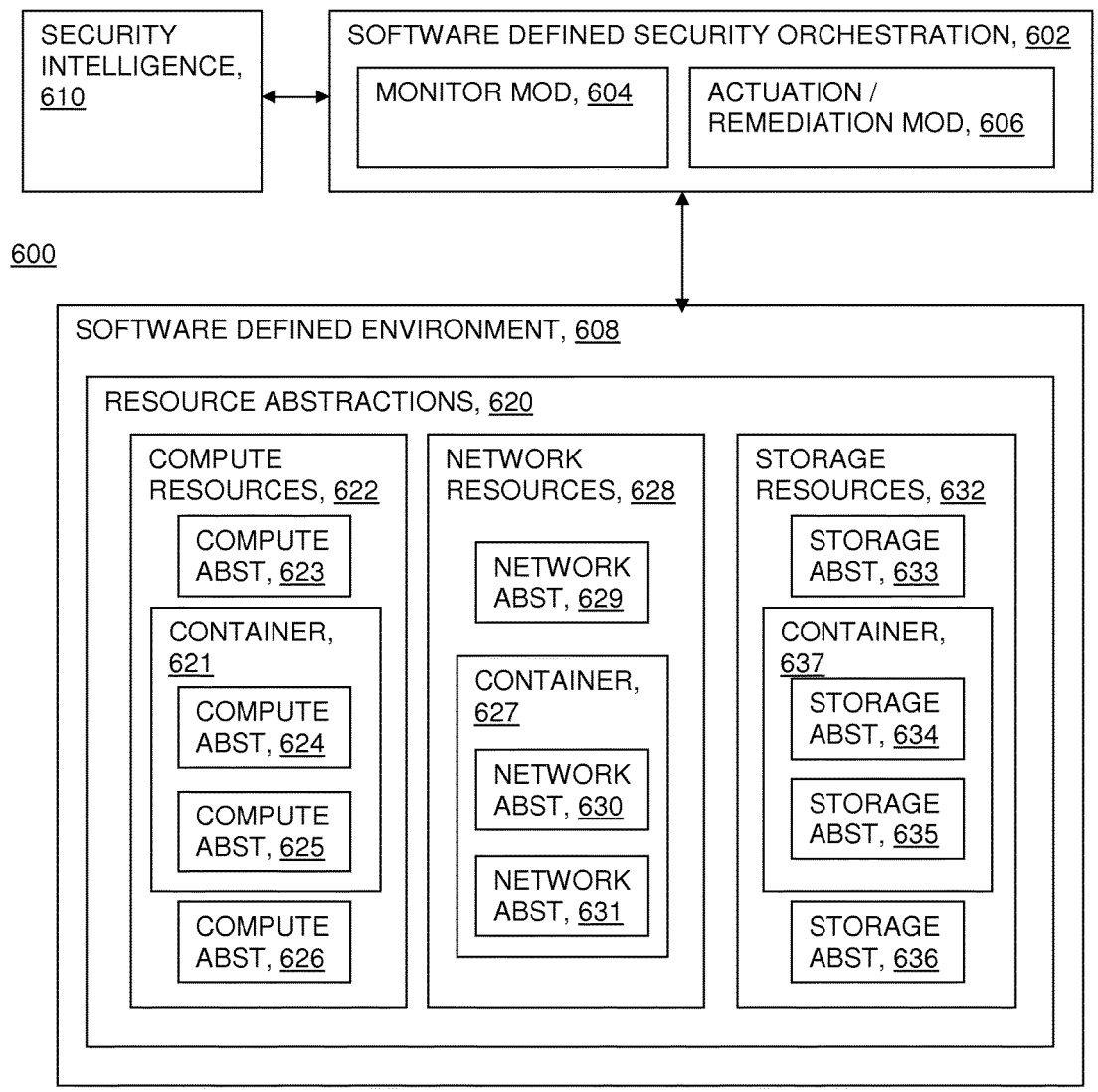
FIG. 6 is a block diagram view of a second embodiment of a system according to the present invention.

FIG. 6 is a functional block diagram illustrating various portions of security system 600, including: software defined security orchestration 602; monitor module ("mod") 604; actuation/remediation mod 606; software defined environment 608; security intelligence platform 610; resource abstractions 620; compute resources (e.g. Power VM, x86 KVM, high memory BW nodes, high single thread performance nodes, high thread count nodes, and micro server nodes) 622; compute abstractions 623, 624, 625, 626; compute container 621; network resources (e.g. RDMA, Ethernet) 628; network abstractions 629, 630, 631; network container 627; storage resources (e.g. SSD, HDD, tape, file and block storage) 632; storage abstractions 633, 634, 635, 636; and storage container 637.

In this example, resource abstractions 620 for compute 622, storage 632, and network 628 each capture both the capability and the capacity. Also, the topology of how the resources are interconnected is captured in the abstractions. It should be noted that both functional and non-functional aspects are included. Aspects include: (i) reliability; (ii) availability; (iii) serviceability; (iv) resiliency; and (v) vulnerability. Further, workload abstractions capture the interdependency of: (i) different workload components; (ii) the functional requirements; (iii) the non-functional requirements; and (iv) the contextual information. Functional and/or non-functional requirements include resiliency, security, and compliance.

Sub-containers 621, 627, and 637 are each self-describing containers making up a single end-to-end container (not shown) according to a context-aware policy. The run time within software defined environment 608 viewed as collections of many self-describing containers, includes: virtual machine containers, bare metal containers, and/or other hypervisor/OS-specific containers. In this example, an end-to-end container includes the three resource abstractions compute 621, network 627, and storage 637. In that way, the totality of the end-to-end run time environment is captured by the container. Alternatively, some sub-set of the three resources is accounted for in the end-to-end container.

Each "software defined" end-to-end container has an isolation mechanism with respect to the rest of the SDE. The software defined compute sub-container 621 is isolated, for example, through the hypervisor if it is a VM. Other container structures include: (i) Java container (isolated through the separation of memory space); (ii) SOA container; (iii) Oracle/Sun Solaris container (isolated through zones on top of the Solaris OS); (iv) a container within Google chrome/chromium environment; and (v) the emerging Docker container. Isolation in the data and software defined storage area is achieved through partitioning and encryption. Isolation in software defined network is achieved through separate definition of "flows" in, for example, an OpenFlow environment. (Note: the term(s) "Java," "Oracle," "Sun," "Solaris," "Google," "OpenFlow," and/or "Docker" may be subject to trademark rights in various jurisdictions throughout the world and are used here only in reference to the products or services properly denominated by the marks to the extent that such trademark rights may exist.)

Self-describing containers include the metadata related to the "content" inside the containers. The metadata describes, for example, what's inside the container, what does the container do, container-relevant security, and/or container-relevant compliance policies. The self-describing aspect of the end-to-end containers lends itself to the portability of the container. Portability becomes important when the container is subject to suspension, being resumed, and/or migration from time to time. In this example, the data model for the metadata itself is self-describing so that the metadata is correctly understood and/or interpreted everywhere.

Some embodiments of the present invention achieve semantic interoperability within the SDE through: (i) sharing a common ontology registry; and/or (ii) resolving the mapping among the ontology during runtime through (a) manual association, or (b) automatic/autonomic learning.

Figure 7:
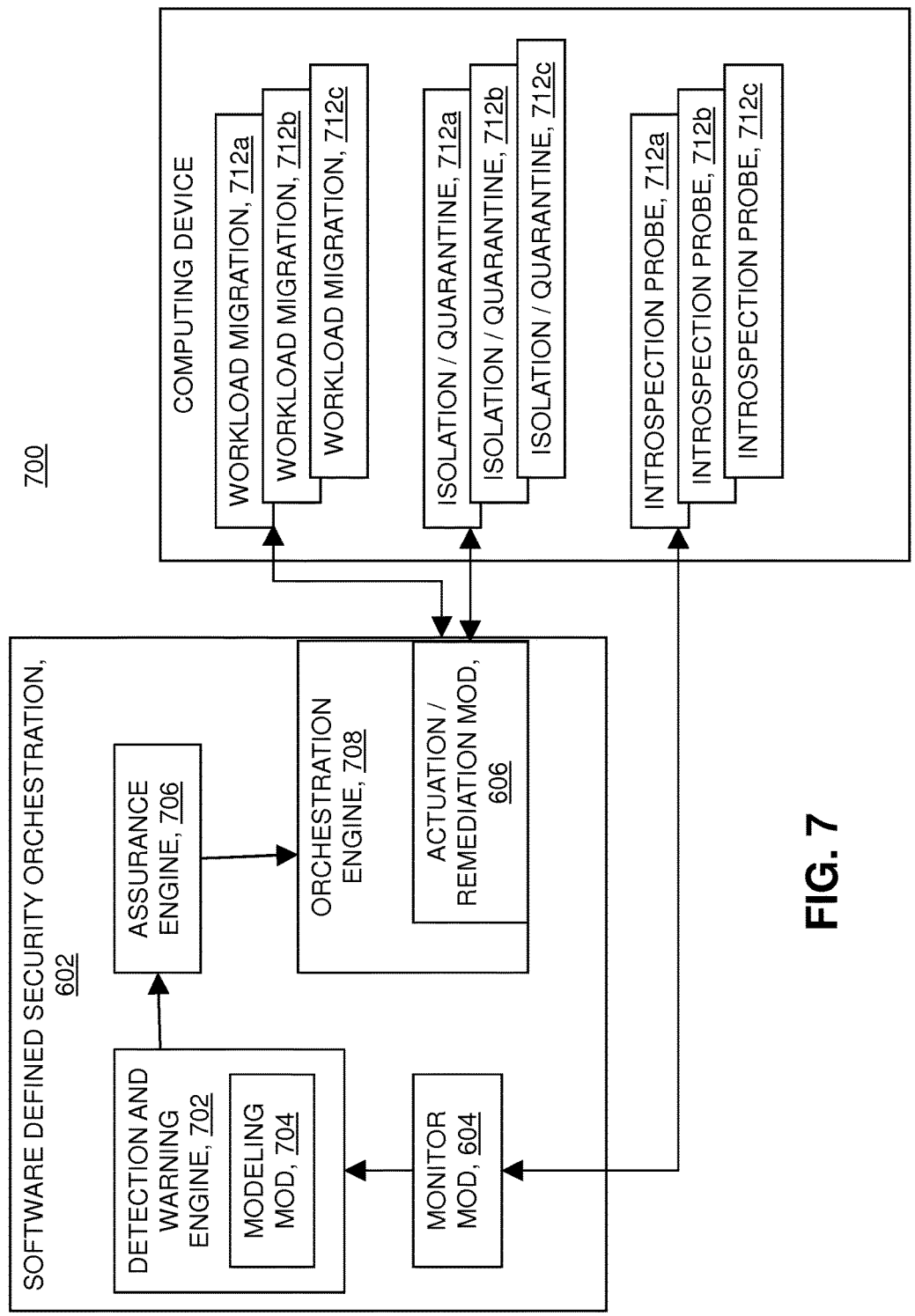
FIG. 7 is a block diagram view of a machine logic (for example, software) portion of the second embodiment system.

FIG. 7 is a functional block diagram further illustrating software defined security orchestration 602 and container-based tools within SDE 608. Security orchestration 602 is further illustrated to include: far field detection and early warning engine 702; modeling module 704; assurance engine 706; and orchestration engine 708. Container-based tools include: deep introspection probes 710a, 710b, 710c, fast workload migration modules 712a, 712b, 712c; and isolation and quarantine modules 714a, 714b, 714c.

As illustrated in FIGS. 6 and 7, policy specification, policy monitoring, and policy enforcement are each container-based. That is, the security and compliance policies for workloads, infrastructure, and people are managed on a per-container basis. In this example, the enforcement of these policies includes the following three components, each of which is associated with each and every container within the software defined environment: (i) container-specific policy specification; (ii) multi-faceted integrity monitoring, by monitor mod 604; and (iii) fine-grained isolation management, by actuation/remediation mod 606. More specifically, the security and compliance policy (including its semantics and ontology) is specified for each container in a self-describing manner so that the specification is entirely portable across the entire software defined environment. The integrity of each container is continuously monitored in terms of the "facets": workload, infrastructure, and people. Software defined "probes," shown as deep introspection probes 710a, 710b, and 710c, are used to conduct deep introspection of the workloads and software defined infrastructure components. Finally, the fine-grained isolation management, via isolation and quarantine modules 714a, 714b, and 714c, ensures end-to-end isolation for each container, which includes compute, data/storage, and/or network resources.

In this example, the output from the monitored results feeds into early warning and far field detection engine 702, discussed in detail below. In some embodiments, these results are compared to the policy specification continuously to identify potential deviation from the policy specification. The output of assurance engine 706 provides for continuous and proactive orchestration for potential preventive and/or survival measures.

In some embodiments, early warning and far-field detection mechanisms are based on the stitching together data using behavior models including models for: (i) workload(s); (ii) application(s); (iii) infrastructure; and/or (iv) people. Workload behavior is captured by one or more of the following indicators: (i) spatio-temporal footprints of the infrastructure; (ii) temporal progression of the usage of the resources (as time series); (iii) activation of various components within a given workload; and (iv) invocation of various services. Workload behavior models are built on top of the contextual aspects of the SDE including: (i) application topology; (ii) connectivity to the data source(s); and/or (iii) connectivity to the data sink(s).

Infrastructure behavior is captured by the events generated by the software defined system. The behavior model is based on one of various deterministic models or probabilistic models including: (i) finite state machine; (ii) petri net; and (iii) other types of representations. Infrastructure behavior models are built on top of the contextual aspects of the SDE including: (i) physical topology; and/or (ii) mapping of the software defined infrastructure to the physical infrastructure.

People (e.g. user, system admin, and cyber defender) behavior includes the contextual aspects of the behavior such as: (i) organizational structure; (ii) social networks (within and/or outside of the organization); (iii) individual role(s); and (iv) individual responsibility(ies). The behavior model for people is oftentimes a probabilistic function. In this example, the behavior model for intrusion is constructed such that it facilitates predicting the future course of the intrusion within a given environment once the intrusion is detected.

Some embodiments of the present invention use behavior models for the following purposes: (i) data integration and federation; (ii) predictive analytics and condition-based monitoring; and/or (iii) what-if analysis. The behavior model has uses including: (i) stitching multi-channel raw event data (as well as other data) together, (ii) addressing any noise, missing data, or other data uncertainty issues; and (iii) predictive analytics related to the general area of "condition-based monitoring," where the future behavior of a given workload, infrastructure, and/or people is projected and compared to corresponding actual events. This provides for early warning at a much earlier stage than with simple thresholding or other more reactive conventional techniques. What-if analysis becomes possible by projecting the future path on the condition of asserted values for a subset of the controllable variables. By applying what if analysis, a control action that leads to the best estimated outcome will be selected for going forward.

Some embodiments of the present invention invoke proactive orchestration when it is determined that either high risk behavior or actual malicious behavior is observed within the workload, infrastructure, and/or people. Proactive orchestration by orchestration engine 708 (FIG. 7) involves: (i) quarantine actions; (ii) migration actions; and/or (iii) active monitoring actions.

SDEs provide the ability to isolate (or quarantine) an individual environment at multiple granularities with various mechanisms. The quarantine mechanisms applying to the infrastructure and workload include: (i) the isolation mechanisms provided by the end-to-end container at various layers of the stack; (ii) the isolation mechanisms provided by software defined network; and (iii) the isolation mechanisms provided by the software defined storage. These isolation mechanisms include isolation through policies, non-overlapping memory/storage address space (and copy-on-write for shared memory space), as well as separation through enforcing different crypto-keys within each individual domain. Isolation mechanisms that apply to people include mandatory access control, role based access control, and/or rights management mechanisms for various types of content resources.

When it is determined that the current environment for executing the workload becomes vulnerable for any reason, in some embodiments, the workload is migrated. Migration oftentimes requires rejuvenating (rebuilding) the application environment at a new physical location with minimal disturbance to the rest of the input/output environments. Finally, SDEs provide for set up of honeypots within the infrastructure (because of much better isolation of the honeypots from the rest of the environments). Some embodiments of the present invention dynamically set up honeypots to entice and trap both external and insider intrusion resulting in improved observation of the intrusion behavior.

Exemplary use cases follow where security policies and service level agreements (SLAs) are driven by software defined infrastructure and the available unified control plane. With continued reference to FIG. 7, security policies and SLAs corresponding to the workload are managed by far field detection and early warning engine 702. In this example, the detection and warning engine handles tasks including: (i) notification; (ii) SDE security analytics; (iii) workload security profile monitoring; and (iv) remediation. The detection and warning engine is in communication with assurance engine 706 where deployment-time security is provided according to workload definition(s). Further, orchestration engine 708 receives inputs from the assurance engine and the detection and warning engine for run-time security configuration. Workload security policies and SLAs include, for example: (i) critical file integrity monitoring; (ii) critical file patching; (iii) placement of compute resources; (iv) compute resources credentials; (v) managed scanning; (vi) connectivity; (vii) isolation; (viii) load balancing; (ix) file level confidentiality; and (x) object level confidentiality.

Security policies and SLAs corresponding to the software-defined infrastructure are handled by monitor module 604, and actuation/remediation module 606, where compute, storage, and networking resource abstractions are managed through a dashboard or via an application programming interface (API) for physical hardware. Infrastructure security policies and SLAs include, for example: (i) host integrity; (ii) secure and trusted boot; (iii) availability of hardware security module (HSM); (iv) network availability; (v) network confidentiality; (vi) network location; (vii) storage confidentiality; (viii) storage access control; (ix) storage encryption; (x) secure storage deletion; (xi) secure storage erasure; (xii) physical destruction of storage; (xiii) control plane integrity; and (xiv) multi-tenancy.

In operation, for example, detection of anomalous traffic and actions resulting in remediation using the software-defined network proceeds as follows. Having defined the workload and identified the infrastructure requirements, a URL (uniform resource locator) blacklist is consulted during monitoring activities. Upon detection of network access to a malicious URL, actuation and remediation module 606 operates to reconfigure the network while traffic from the affected virtual machine is conditionally blocked.

Additional use cases and example responses follow. Violation of integrity of a critical file, e.g. web server, results in detection of the violation and subsequent flagging and/or blocking. Violation of integrity of a critical file across multiple servers and/or workloads results in detection of the violation and subsequent flagging and/or blocking. Detection of anomalous (out of profile) communication pattern for complex workloads results in deviation from a "desired state" expressed in a behavior model. Deployment of a workload across multiple data centers results in a resource model to express trust assumptions and corresponding requirements. Finally, some embodiments of the present invention provide for a configurable strength of data deletion scenario.

Some embodiments of the present invention include one, or more, of the following features, characteristics, and/or advantages: (i) ensures the security of applications, data, and/or infrastructure within a software defined environment (SDE) where the entire infrastructure (compute, storage, and networking) is programmable; (ii) ensures the security of applications, data, and/or infrastructure within an SDE where the control plane(s) for storage and/or networking are separated from the data plane(s); (iii) provides a low-overhead approach for capturing the provenance of events (e.g. who has done what, at what time, to whom, and in what context); and/or (iv) provides a low-overhead approach for identifying a suspicious event in a rapidly changing virtual topology.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
    establishing a security container in a software-defined environment, the security container describing a workload and a set of resources, the set of resources being required by the workload;
    determining a set of resource-divisible portions of the workload including a compute-resource portion, a storage resource portion, and a network resource portion;
    generating a plurality of sub-containers within the security container, a sub-container within the plurality of sub-containers representing only one resource-divisible portion of the workload;
    determining a set of security criteria for the security container;
    monitoring the workload and the set of resources for security events based, at least in part, upon the set of security criteria; and
    responsive to identifying a security event, adjusting one or more security mechanisms;
    wherein:
    the plurality of sub-containers represent an end-to-end run time environment for processing the workload;
    the end-to-end run time environment includes bare metal sub-containers and hypervisor-specific sub-containers;
    the set of resources are software abstractions; and
    at least the steps of monitoring and adjusting are operated within the software-defined environment.

2. The method of claim 1, wherein the set of security criteria includes a container-specific policy specification that is portable throughout the software defined environment.

3. The method of claim 1, wherein the step of monitoring includes one of deep introspection, condition-based monitoring, and applying a behavior model to a resource within the set of resources.

4. The method of claim 3 wherein the step of monitoring includes applying a behavior model to workload behavior, the workload behavior captured by one of a set of spatio-temporal footprints of an infrastructure element in the software-defined environment, a temporal progression of usage of the set of resources, activating a set of components within the workload, and invoking a service performed by the workload.

5. The method of claim 1, wherein the step of adjusting one or more security mechanisms includes one of inserting a security mechanism, and removing a security mechanism.

6. The method of claim 1, wherein the one or more security mechanisms includes isolation mechanisms provided by the plurality of sub-containers at various layers of a stack.

7. A computer program product comprising a computer readable storage medium having stored thereon program instructions programmed to:
    establish a security container in a software-defined environment, the security container describing a workload and a set of resources, the set of resources being required by the workload;

determine a set of resource-divisible portions of the workload including a compute-resource portion, a storage resource portion, and a network resource portion;

generate a plurality of sub-containers within the security container, a sub-container within the plurality of sub-containers representing only one resource-divisible portion of the workload;

determine a set of security criteria for the security container;

monitor the workload and the set of resources for security events based, at least in part, upon the set of security criteria; and responsive to identifying a security event, adjust one or more security mechanisms;

wherein:

the plurality of sub-containers represent an end-to-end run time environment for processing the workload;

the end-to-end run time environment includes bare metal sub-containers and hypervisor-specific sub-containers; and the set of resources are software abstractions.

8. The computer program product of claim 7, wherein the set of security criteria includes a container-specific policy specification that is portable throughout the software defined environment.

9. The computer program product of claim 7, wherein the program instructions programmed to monitor are further programmed to perform one of deep introspection, condition-based monitoring, and applying a behavior model to a resource within the set of resources.

10. The computer program product of claim 7, wherein adjusting one or more security mechanisms includes one of inserting a security mechanism, and removing a security mechanism.

11. The computer program product of claim 7, wherein the one or more security mechanisms includes isolation mechanisms provided by the plurality of sub-containers at various layers of a stack.

12. A computer system comprising:

a processor(s) set; and a computer readable storage medium;

wherein:

the processor set is structured, located, connected, and/or programmed to run program instructions stored on the computer readable storage medium; and the program instructions include program instructions programmed to:

establish a security container in a software-defined environment, the security container describing a workload and a set of resources, the set of resources being required by the workload;

determine a set of resource-divisible portions of the workload including a compute-resource portion, a storage resource portion, and a network resource portion;

generate a plurality of sub-containers within the security container, a sub-container within the plurality of sub-containers representing only one resource-divisible portion of the workload;

determine a set of security criteria for the security container;

monitor the workload and the set of resources for security events based, at least in part, upon the set of security criteria; and responsive to identifying a security event, adjust one or more security mechanisms;

wherein:

the plurality of sub-containers represent an end-to-end run time environment for processing the workload;

the end-to-end run time environment includes bare metal sub-containers and hypervisor-specific sub-containers; and the set of resources are software abstractions.

13. The computer system of claim 12, wherein the set of security criteria includes a container-specific policy specification that is portable throughout the software defined environment.

14. The computer system of claim 12, wherein the program instructions programmed to monitor are further programmed to perform one of deep introspection, condition-based monitoring, and applying a behavior model to a resource within the set of resources.

15. The computer system of claim 12, wherein adjusting one or more security mechanisms includes one of inserting a security mechanism, and removing a security mechanism.

16. The computer system of claim 12, wherein the one or more security mechanisms includes isolation mechanisms provided by the plurality of sub-containers at various layers of a stack.

* * * * *